United States Patent [19]

Huggett et al.

[11] Patent Number: 5,183,387
[45] Date of Patent: Feb. 2, 1993

[54] FAULT-TOLERANT APPARATUS FOR CONTROLLING BLADE PITCH

[75] Inventors: Colin E. Huggett; Kenneth L. Wuertz, both of Torrance, Calif.

[73] Assignee: Allied-Signal, Inc., Morris Township, Morris County, N.J.

[21] Appl. No.: 817,027

[22] Filed: Jan. 3, 1992

[51] Int. Cl.$^5$ .................... B63H 3/00; B63H 3/06
[52] U.S. Cl. .................... 416/147; 416/31; 416/32; 416/151; 416/152; 188/267; 188/164
[58] Field of Search .................... 416/31, 32, 47, 48, 416/147, 151, 152; 188/267, 164

[56] References Cited

U.S. PATENT DOCUMENTS

| | | | |
|---|---|---|---|
| 2,314,025 | 3/1943 | Waseige | 416/151 |
| 2,370,135 | 2/1945 | Berliner | 416/152 |
| 2,868,304 | 1/1959 | Horn | 416/48 |
| 3,020,007 | 2/1962 | Hine | 416/48 |
| 4,578,019 | 3/1986 | Safarik | 416/151 |
| 4,591,313 | 5/1986 | Miyatake et al. | 416/155 |
| 4,678,401 | 7/1987 | Bradford et al. | 416/32 |
| 5,023,499 | 6/1991 | Kuwahara | 188/164 |

FOREIGN PATENT DOCUMENTS

| | | | |
|---|---|---|---|
| 0984485 | 7/1951 | Fed. Rep. of Germany | 416/152 |
| 0885210 | 8/1953 | Fed. Rep. of Germany | 416/151 |

*Primary Examiner*—Edward K. Look
*Assistant Examiner*—Mark Sgantzos
*Attorney, Agent, or Firm*—Hugh P. Gortler; Robert A. Walsh

[57] ABSTRACT

Fault-tolerant apparatus for controlling first and second input members of a mechanical actuator includes first and second electrical machines and at least two controllers. The first and second electrical machines, which apply braking forces to the first and second input members, respectively, are provided with stators having pluralities of isolated phase windings. Each controller is coupled to a phase winding of the first electrical machine, and also to a phase winding of the second electrical machine. Any one controller can excite the first electrical machine to apply the braking force to the first input member or the second electrical machine to apply the braking force to the second input member.

40 Claims, 3 Drawing Sheets

FAULT-TOLERANT APPARATUS FOR CONTROLLING BLADE PITCH

FIELD OF THE INVENTION

This invention relates in general to blade pitch and in particular to fault-tolerant apparatus for controlling fan blade pitch of variable-pitch turbofan engines.

BACKGROUND OF THE INVENTION

There is a great need for fault-tolerant apparatus for controlling fan blade pitch of turbofan engines. In the event of a single failure, non-fault tolerant apparatus would not be able to control the position of the fan blades.

Apparatus for controlling blade pitch can be made fault-tolerant by providing redundant controllers. One controller is designated as a primary controller and the remaining controllers provide backups in succession. Two controllers provide tolerance to a single failure, three controllers provide tolerance to two failures and so on.

There are drawbacks to such fault-tolerant apparatus. To provide tolerance to a single fault, the number of components must be doubled. Also doubled is the weight and cost of the system. As the redundancy is further increased, the weight and cost of the system is increased proportionately.

SUMMARY OF THE INVENTION

Apparatus according to the present invention provides fault tolerance without providing the proportional increase in cost and weight. The fault tolerant apparatus, which is suitable for use with mechanical actuator means having first and second movable input means, comprises first and second electrical machines and at least two controller means. The first and second electrical machines have their rotors secured to the first and second movable input means, and their stators held stationary with respect to their respective rotors. Both stators includes a plurality of isolated phase windings. Each controller means is coupled to a phase winding of the first electrical machine and also to a phase winding of the second electrical machine. Any one controller means can excite either electrical machine to cause a relative displacement between the first and second movable input members.

The fault tolerant apparatus is especially suitable for a mechanical actuator of a variable-pitch turbofan engine having a turbine shaft and a plurality of output shafts upon which fan blades are mounted. The mechanical actuator, which mechanically couples the turbine shaft to the plurality of output shafts, has first and second input shafts which are rotated at the same speed when the turbine shaft is rotating. The mechanical actuator means rotates the output shafts in one direction when the turbine shaft is rotating and when the first input shaft is slowed relative to the second input shaft, and it rotates the output shafts in an opposite direction when the turbine shaft is rotating and when the second input shaft is slowed relative to the first input shaft. Rotation of the output shafts causes blade pitch to change.

The rotor of the first electrical machine is secured for rotation with the first input shaft of the mechanical actuator, and the rotor of the second electrical machine is secured for rotation with the second input shaft of the mechanical actuator. The controller means cooperate to provide excitation currents to selected phase windings of the first and second electrical machines when the blade pitch is to be adjusted. Any one controller means can cause an electrical machine to be excited. The excited machine, in turn, causes the mechanical actuator to adjust the blade pitch.

DETAILED DESCRIPTION OF THE PREFERRED EMBODIMENTS

Figure 1:
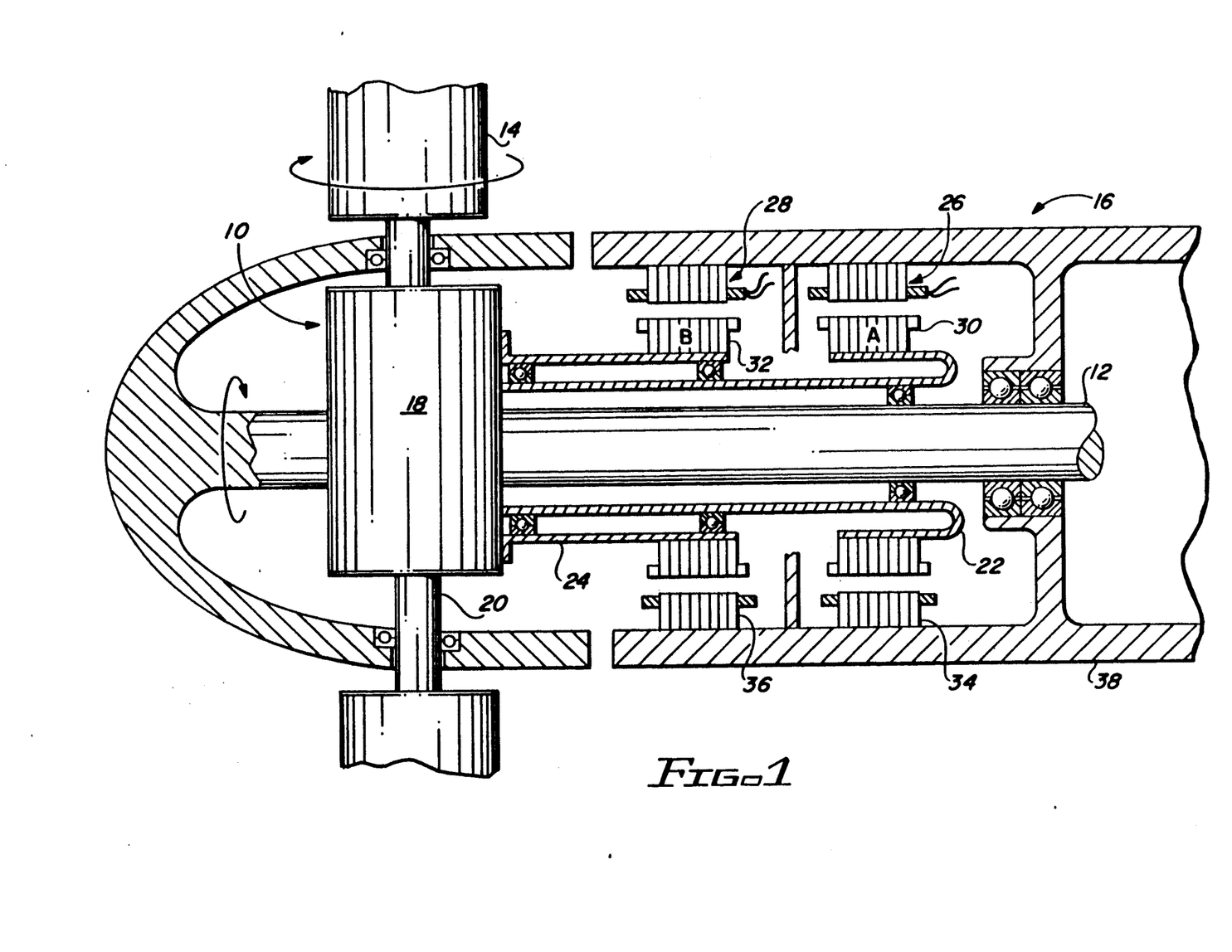
FIG. 1 depicts a mechanical actuator for adjusting blade pitch.

FIG. 1 shows a mechanical actuator 10 which utilizes torque from a turbine shaft 12 to adjust the pitch of fan blades 14 on a turbofan engine 16. The mechanical actuator 10 includes a differential gear train 18 which couples the turbine shaft 12 to a plurality of output shafts 20, two of which are shown. The fan blades 14 are mounted to the output shafts 20. The differential gear train 18 is provided with first and second input shafts 22 and 24. When the differential gear train 18 is rotated by the turbine shaft 12, the first and second input shafts 22 and 24 are rotated at the same speed as the turbine shaft 12. Unless a braking force is applied to one of the input shafts 22 or 24, the differential gear train 18 does not change blade pitch. However, when the rotation of the first input shaft 22 is slowed relative to the second input shaft 24, the differential gear train 18 changes blade pitch in one direction; and when the rotation of the second input shaft 24 is slowed relative to the first input shaft 22, the differential gear train 18 changes blade pitch in the opposite direction. Such a mechanical actuator 10 is described in application Ser. No. 07/699,398 filed on May 13, 1991. This application is incorporated herein by reference.

Fault-tolerant apparatus includes first and second induction machines 26 and 28 whose squirrel cage rotors 30 and 32 are secured for rotation with the first and second input shafts 22 and 24, respectively, and whose respective stators 34 and 36 are affixed to a non-rotating engine structure 38. Each stator 34 and 36 has three isolated windings. Thus, each induction machine 26 and 28 is a three-phase machine whose windings are split out as three single phase windings.

Figure 2:
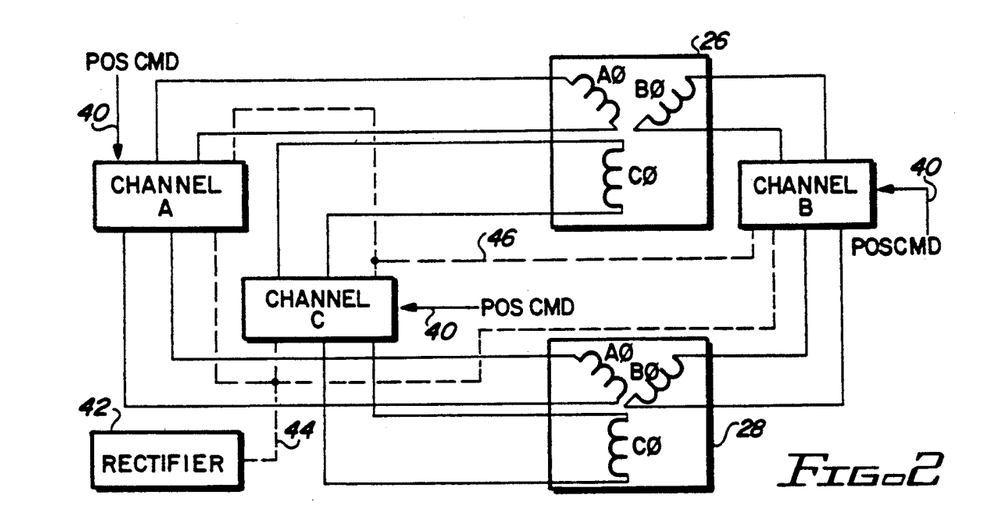
FIG. 2 is a block diagram of fault-tolerant apparatus for controlling blade pitch according to the present invention, said apparatus being employed to drive the mechanical actuator shown in FIG. 1.

Referring now to FIG. 2, the fault-tolerant apparatus further includes first, second and third channels A, B and C, a channel for each phase of the induction machines 26 and 28. The channels A, B and C provide DC excitations to their isolated stator windings φA, φB and φC in response to blade position commands POSCMD from an engine control unit (ECU) over serial data buses 40. Either the first or second induction machine 26 or 28 is excited, but not both at the same time. When the first induction machine 26 is excited, it applies a braking torque to the first input shaft 22. The speed of the first input shaft 22 is slowed relative to that of the second input shaft 24 and, as a result, blade pitch is changed in a positive direction. When the second induction machine 28 is excited, blade pitch is changed in a negative direction. Aircraft power or dedicated alternator output power is rectified by a rectifier 42 and supplied to the channels over a power distribution bus 44. The channels A, B and C intercommunicate, i.e., pass data, over a data transmission bus 46.

Figure 3:
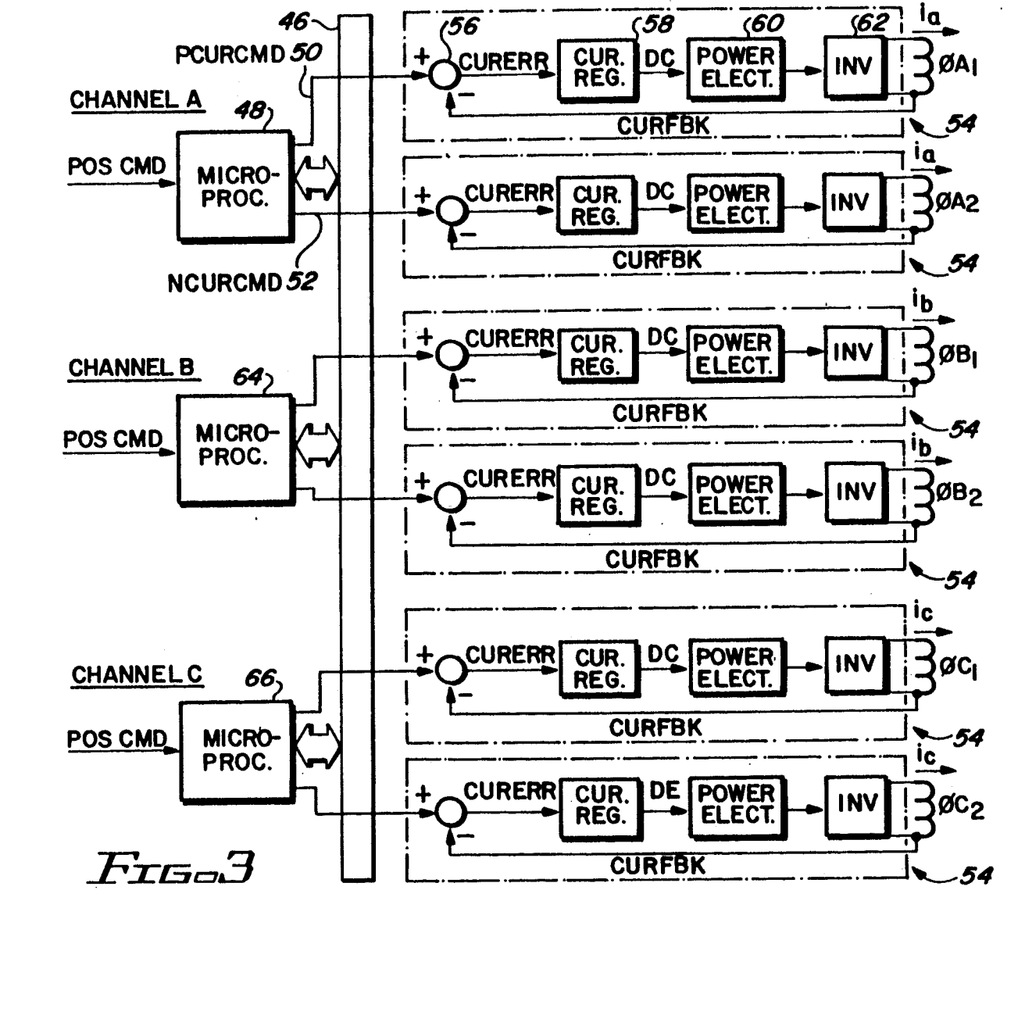
FIG. 3 is a logic diagram of the fault-tolerant apparatus shown in FIG. 2.

Referring now to FIG. 3, the first channel A includes a first microprocessor 48 which receives position commands POSCMD over the serial data bus 40. In response to the position command POSCMD, the first microprocessor 48 generates positive and negative current commands PCURCMD and NCURCMD on its first and second outputs 50 and 52, respectively. One current command PCURCMD or NCURCMD will always be zero.

The first output 50 of the first microprocessor 48 is coupled to a current loop control 54 which regulates the current in the stator winding $\phi A_1$ of the first induction machine 26. A subtracter 56 provides an error signal CURERR indicating the difference between the positive current command PCURCMD and a feedback current CURFBK measured from the stator winding $\phi A_1$. A current regulator 58 amplifies the error signal CURERR to provide a duty cycle command DC. The duty cycle command DC is supplied to power electronics 60 such as a pulse width modulator or pulse density modulator. The power electronics 60 generates commutation commands that are supplied to a solid state, single phase inverter 62 such as a hard-switching or resonant type. In response to the commutation commands, the inverter 62 provides current ia which energizes the stator winding $\phi A_1$. Such current loop controls 54 are well known to those skilled in the art.

Similarly, the second output 52 of the first microprocessor 48 is coupled to the stator winding $\phi A_2$ by a current loop control 54. When the blade pitch must be adjusted in a positive direction, the first microprocessor 48 generates a positive current command PCURCMD, which causes the inverter 62 to energize the stator winding $\phi A_1$. Flux from stator winding $\phi A_1$ produces positive currents in quadrature within the rotating rotor 30 of the first induction machine 26. When the blade pitch must be adjusted in a negative direction, the first microprocessor 48 generates a negative current command NCURCMD which causes stator winding $\phi A_2$ of the second induction machine 28 to be excited.

In a similar manner, the second channel B employs a second microprocessor 64 and two current loop controls 54 to energize the stator windings $\phi B_1$ and $\phi B_2$ of the first and second induction machines 26 and 28, respectively. And, the third channel C employs a third microprocessor 66 and two current loop controls 54 to energize the stator windings $\phi C_1$ and $\phi C_2$ of the first and second induction machines 26 and 28, respectively.

To provide optimum braking torque, the spatially distributed windings $\phi A$, $\phi B$ and $\phi C$ of the excited induction machine must produce an appropriately distributed magneto motive force (mmf). Torque is a function of rotor speed and stator current. To achieve this spatial distribution, the currents ia, ib and ic in the windings $\phi A$, $\phi B$ and $\phi C$ must be regulated such that they sum to zero (i.e., ia+ib+ic=0). To simplify the current control, one current ia, ib or ic is commanded to zero.

For example, current ic=0, leaving currents ia=−ib. However, the manner in which these currents are applied is a matter of design choice.

For the microprocessors 48, 64 and 66 to achieve correct spatial distribution of mmf within the induction machine 26 or 28, there must be communication between the three channels A, B and C such that each microprocessor 48, 64 and 66 can sum the currents ia, ib and ic to zero in the excited induction machine 26 or 28 and thereby generate the appropriate current commands PCURCMD and NCURCMD. The data transmission bus 46 allows for such communication. From the data transmission bus 46, each channel A, B and C receives current commands PCURCMD and NCURCMD. Each channel A, B and C further receives the sensed pitch of the fan blade as measured by the other two channels and measured speed from the first and second induction machines 26 and 28 as measured by the other two channels. Rotor speeds of the induction machines 26 and 28 can be measured by any well-known means, such as pulse pickups.

The data transmission bus 46 not only provides data measured by the other channels, but also receives/transmits information relative to its status (e.g., active/inactive). Table 1 shows the minimum information that each channel requires.

TABLE 1

| | |
|---|---|
| Channel A | Speed rotor 1 |
| Channel B | Speed rotor 1 |
| Channel C | Speed rotor 1 |
| Channel A | Speed rotor 2 |
| Channel B | Speed rotor 2 |
| Channel C | Speed rotor 2 |
| Channel A | Blade Position |
| Channel B | Blade Position |
| Channel C | Blade Position |
| Channel A | status |
| Channel B | status |
| Channel C | status |
| Channel A | Current Command |
| Channel B | Current Command |
| Channel C | Current Command |

Although the data transmission bus 46 can transmit data in analog form, digital data transmission is preferred. All channels A, B and C must be electrically isolated from one another to prevent single events from propagating between channels. Such an event can be a high voltage short to logic power. Electrical isolation between the channels A, B and C can be attained by such means as optical isolation or transformer isolation.

Figure 4:
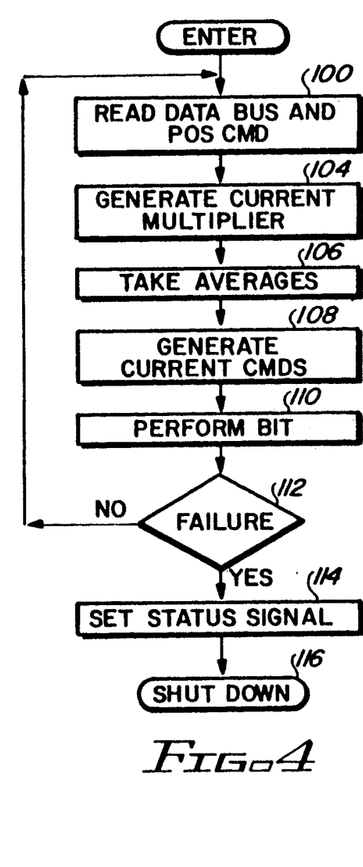
FIG. 4 is a flowchart of a microprocessor routine for each microprocessor in the fault-tolerant apparatus.

FIG. 4 shows a routine that is executed by each microprocessor 48, 64 and 66. First, each microprocessor reads the data off the data bus and position command off the serial bus (module 100). Based on information received over the data transmission bus 46, the microprocessor selects a current multiplier MULTA, MULTB or MULTC as shown in Table 2 (module 104).

TABLE 2

| Channel Status | | | Channel A Multiplier (MULTA) | Channel B Multiplier (MULTB) | Channel C Multiplier (MULTC) |
|---|---|---|---|---|---|
| A | B | C | | | |
| OK | OK | OK | 1 | −1 | 0 |
| OK | Fail | OK | 1 | 0 | −1 |
| Fail | OK | OK | 0 | 1 | −1 |
| OK | OK | Fail | 1 | −1 | 0 |
| OK | Fail | Fail | 1 | 0 | 0 |
| Fail | OK | Fail | 0 | 1 | 1 |

TABLE 2-continued

| Channel Status | | | Channel A Multiplier (MULTA) | Channel B Multiplier (MULTB) | Channel C Multiplier (MULTC) |
|---|---|---|---|---|---|
| A | B | C | | | |
| Fail | Fail | OK | 0 | 0 | −1 |

The computed current commands will be multiplied by these current multipliers MULTA, MULTB and MULTC to allow, for example, current ic=0 and currents ia=−ib.

Next, the microprocessor takes an average (module 106) of the position feedbacks and first and second rotor speeds. This average ensures that each channel A, B and C generates an identical current command. All first and second rotor speeds, as well sensed positions, will be examined by each channel. If any of the rotor speeds or sensed positions differ by a predetermined error (derived from an error analysis), that data will be discarded, and the average value of the remaining data will be taken. If all three channels indicate the data is within a specified error tolerance, the average of the data is taken.

Using the averages of blade position and rotor speeds, the microprocessor generates the positive and negative current commands PCURCMD and NCURCMD (module 108). With each channel A, B and C performing the source computation on the same data, identical current commands can be guaranteed, ensuring that the correct spatial distribution of mmf is achieved within the motor.

Finally, built-in test of the controller is performed to ensure the controller is operating correctly (module 110). Failure to pass the BIT (module 112) will result in the microprocessor setting its status signal low (module 114) and shutting down the affected channel (module 116). By setting its status signal to a low state, the microprocessor allows the other channels to provide braking torque. The alternate channels will recognize the failure via data transmitted over the data transmission bus 46. If no failures are detected (module 110), the microprocessor returns to the first block and reads data off the data buses (module 100).

Figure 5:
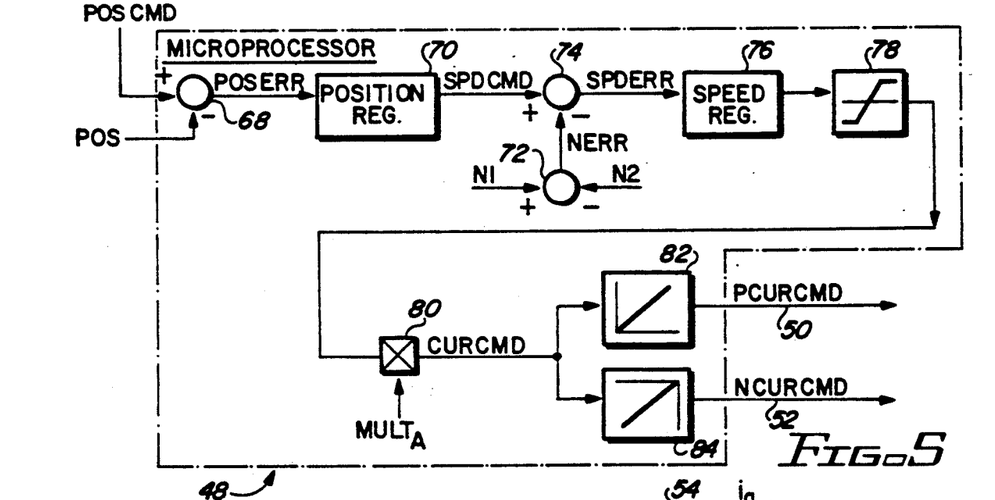
FIG. 5 is a logic diagram of a microprocessor routine for generating current commands.

FIG. 5 shows the microprocessor routine for generating current commands. The first microprocessor 48 is used by way of example. The position command POSCMD is compared to the average blade position POS by a first subtracter 68, whose output provides an error signal POSERR. The error signal POSERR is amplified within a position regulator 70, whose output produces a speed command SPDCMD. A second subtracter 72 derives a differential rotor speed by subtracting signals N1 and N2 indicating average rotor speeds of the first and second induction machines 26 and 28. A signal NERR indicating the differential rotor speed is subtracted from the speed commands SPDCMD by a third subtracter 74, whose output signal SPDERR is amplified within a speed regulator 76. An output of the speed regulator 76 provides a signal which is limited between upper and lower limits, by an authority limiter 78 and multiplied by this channel multiplier MULTA via a multiplier 80. An output of the multiplier 80 provides a current command CURCMD.

The current command CURCMD is divided into two paths. A first function block 82 provides current commands PCURCMD having values greater than or equal to zero, and a second function block 84 provides current commands NCURCMD having values less than or equal to zero. These current commands PCURCMD and NCURCMD are provided on first and second outputs 50 and 52, respectively, of the first microprocessor 48.

In the event one winding becomes open or shorted, or in the event that the power electronics 60 of one current loop control 54 fails, the fault-tolerant controller can still energize two windings to provide full braking torque. The inoperative channel is deactivated and the remaining two channels are made active. For example, if channel A fails, the status signal for channel A goes low. In response to this status signal, channels B and C select current multipliers such that current ia=0 and currents ib=−ic. Thus, failure of one channel, if detected, does not reduce the performance of the system provided that the remaining two channels are configured to provide opposite and equal currents. It can be readily appreciated by those skilled in the art that the mmf produced by any two currents can be controlled to the same equivalent amplitude as all three currents; therefore, no loss in performance results from the failure of one channel. Thus, the system operates at full performance following the first failure.

If a second failure occurs, brake torque is reduced for a given current level since only one winding is energized. Thus, if channels A and B fail, current −ic is applied to either stator winding $\phi C_1$ or $\phi C_2$ only. Still, a braking torque is still produced. The fault-tolerant apparatus operates at approximately 80% performance following the failure of a second channel. Full performance can be restored if current −ic is increased.

Thus disclosed is a fault-tolerant apparatus which can accurately position fan blades despite one or two failures within a microprocessor, power electronics or induction machine. The fault-tolerant apparatus has significant weight advantages over apparatus that would provide duplicate machines, microprocessors and power electronics to achieve redundancy.

The fault-tolerant apparatus can be modified to perform two additional modes of operation for the mechanical actuator 10. It can change pitch on a non-operational engine by applying AC excitation to one stator to turn either the first or second input shaft 22 or 24; and it can allow for electric power generation by exciting one or both stators and using the excited induction machine as an induction generator. However, the apparatus is not fault-tolerant for these modes of operation.

Figure 6:
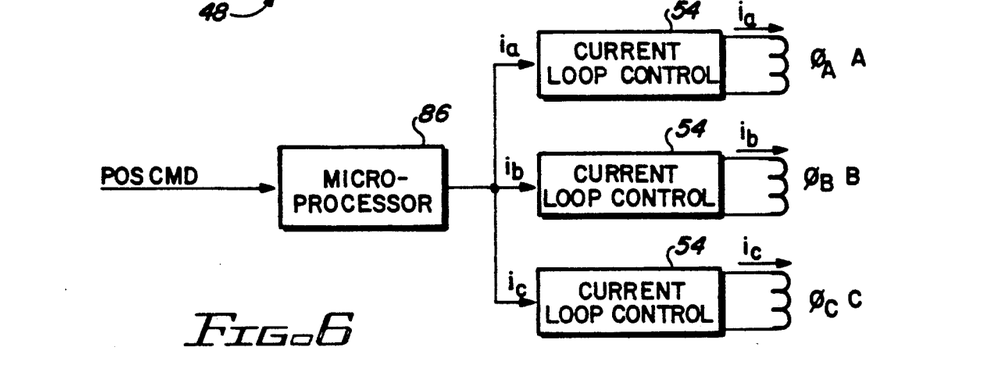
FIG. 6 is a logic diagram of an alternate embodiment of the fault-tolerant apparatus according to the present invention.

FIG. 6 presents an alternate embodiment of apparatus which achieves a degree of redundancy associated with induction machine windings $\phi A$, $\phi B$ and $\phi C$ current loop controls 54. Three channels A, B and C are controlled by a single microprocessor 86 that adjusts the necessary current commands ia, ib and ic to the three channels A, B and C. Two channels are active and the other one is held in reserve. When the active channel fails, the microprocessor 86 disables the failed channel and continues to provide the required torque via the remaining two channels. Failure of another channel would then enable the remaining channel to operate. Although a data transmission bus is not required, such a configuration has single point failures, most notably the microprocessor 86.

It must be emphasized that the fault-tolerant apparatus is not limited to use with the mechanical actuator 10 shown in FIG. 1. Rather, the fault tolerant apparatus is suitable for use with any mechanical actuator that has input means to which braking torques can be applied.

It will be understood that the embodiments described herein are merely exemplary and that many modifications and variations of the present invention are possible in light of the above teachings. For example, the fault-tolerant apparatus can employ two-phase induction machines and two channels, thereby providing a tolerance to one failure. Alternatively, the fault-tolerant apparatus can be modified to accommodate more than three channels. Therefore, the scope of the present invention is limited only by the appended claims.

What is claimed is:

1. Apparatus for controlling mechanical actuator means having first and second movable input means, comprising:

a first electrical machine having a first rotor secured to said first movable input means and a first stator held stationary with respect to said first rotor, said first stator having a first plurality of isolated phase windings;

a second electrical machine having a second rotor secured to said second movable input means and a second stator held stationary with respect to said second rotor, said second stator having a second plurality of isolated phase windings; and at least two controller means cooperating to provide excitation currents to selected windings of said first and second electrical machines to cause a relative displacement between said first and second movable input means, each controller means being coupled to a corresponding phase winding in said first plurality and to a corresponding phase winding in said second plurality, wherein any one of said at least two controller means can excite said electrical machines to cause said relative displacement.

2. Apparatus according to claim 1, wherein said first and second movable input means of said mechanical actuator means includes first and second input shafts, respectively, and wherein said first and second rotor are secured for rotation with said first and second input shafts, respectively.

3. Apparatus according to claim 2, wherein said first and second input shafts are rotated at the same speed by said mechanical actuator means, wherein said at least two controller means cooperate to excite said first electrical machine to provide an mmf which slows the rotation of said first input shaft relative to said second input shaft, and wherein said at least two controller means cooperate to excite said second electrical machine to provide an magnets motive force (mmf) which slows the rotation of said second input shaft relative to said first input shaft.

4. Apparatus according to claim 3, wherein said first and second electrical machines are induction machines having squirrel cage rotors, and wherein said excitation currents are DC excitation currents.

5. Apparatus according to claim 1, wherein each said controller means includes:

microprocessor means for generating current commands when said relative displacement is desired; and current loop control means, responsive to said current commands, for providing said excitation currents to said corresponding phase windings in said first and second pluralities.

6. Apparatus according to claim 5, wherein each said current loop control means includes a first current loop control coupling said microprocessor means to said corresponding phase winding in said first plurality and a second current loop control coupling said microprocessor means to said corresponding phase winding in said second plurality, said first and second current loop controls functioning to provide said excitation currents to their corresponding phase windings in response to said current commands provided by said microprocessor means.

7. Apparatus according to claim 6, wherein each said current loop control includes:

duty cycle means, responsive to said current command, for providing duty cycle commands;

power electronic means, responsive to said duty cycle commands, for generating commutation commands; and inverter means, responsive to said commutation commands, for providing said excitation currents.

8. Apparatus according to claim 6, wherein each said microprocessor means provides positive current commands to its first current loop control and negative current commands to its second current loop control, whereby said first electrical machine is excited when said relative displacement in a first direction is desired and whereby said second electrical machine is excited when said relative displacement in a second direction is desired.

9. Apparatus according to claim 8, wherein a single microprocessor comprises said microprocessor means for said at least two controller means, whereby said single microprocessor provides said positive and negative current commands to said current loop controls.

10. Apparatus according to claim 8, wherein said microprocessor means includes at least one microprocessor, whereby said apparatus includes at least two microprocessors, each said microprocessor including current command means for providing said positive current commands to its first current loop control, whereby an excited winding in said first plurality provides mmf which brakes said first rotor, said current command means providing said negative current commands to its second current loop control, whereby an excited winding in said second plurality provides mmf which brakes said second rotor.

11. Apparatus according to claim 10, further including means for controlling spatial distribution of said mmf provided by said first and second electrical machines.

12. Apparatus according to claim 11, wherein each said microprocessor includes status means for issuing status signals indicative of whether the corresponding microprocessor is active, wherein said distribution means includes communication means for allowing said at least two microprocessors to pass said status signals to one another, and wherein each said microprocessor further includes enabling means, responsive to said status signals, for enabling its current command means to provide said positive and negative current commands.

13. Apparatus according to claim 12, wherein said communication means includes a data transmission bus.

14. Apparatus according to claim 12, wherein said status means includes means for performing a built in test (BIT) said status signal indicating an active status when said corresponding microprocessor passes said BIT.

15. Apparatus according to claim 12, wherein said mechanical actuator means displaces at least one output member in response to a relative displacement between said first and second movable input means, wherein said apparatus further includes first measuring means for providing position signals indicative of measured position of said output member and second measuring means for providing differential speed signals indicative of differential speed between said first and second electrical machines, wherein said at least one parameter includes a position command, and wherein said current command means includes:

first error signal means, responsive to said position command and said position signal, for generating a position error signal;

position regulator means, responsive to said position error signal, for generating a speed command;

second error signal means, responsive to said speed command and said differential speed signal, for generating a speed error signal, whereby a non-null speed error signal indicates that a relative displacement is desired;

speed regulator means, responsive to said speed error signal, for generating current commands, said current commands being provided to said enabling means; and splitting means, responsive to an output of said enabling means, for providing said current commands having positive values on a first output and for providing said current commands having negative values on a second output, whereby said first output provides said positive current commands and said second output provides said negative current commands.

16. Apparatus according to claim 15, wherein said enabling means includes:

generator means, responsive to said status signals, for generating current multipliers indicating said current command means to be enabled; and multiplier means for multiplying together said current command and said current multiplier, an output of said multiplier means providing an output of said enabling means.

17. Apparatus according to claim 15, wherein each said controller means has means for providing a position signal, wherein each said microprocessor reads and transmits said position signals on said communication means, and wherein each said microprocessor further includes first averaging means for taking a first average of said position signals from said at least two controller means, said first average being supplied to said first error signal means as said position signal.

18. Apparatus according to claim 15, wherein each said controller means has means for providing a differential speed signal, wherein each said microprocessor reads and transmits said differential speed signals on said communication means, wherein each said microprocessor further includes first averaging means for taking a first average of said differential speed signals from said at least two controller means, said first average being supplied said second error signal means as said differential speed signal.

19. Apparatus for positioning at least one output member using the drive shaft of an engine, comprising:
mechanical actuator means for mechanically coupling said drive shaft to said at least one output member, said mechanical actuator means having first and second movable input means, said mechanical actuator means changing the position of said at least one output member in response to a relative displacement between said first and second movable input means;

a first electrical machine having a first rotor secured to said first movable input means and a first stator held stationary with respect to said first rotor, said first stator having a first plurality of isolated phase windings;

a second electrical machine having a second rotor secured to said second movable input means and a second stator held stationary with respect to said second rotor, said second stator having a second plurality of isolated phase windings; and at least two controller means cooperating to provide excitation currents to selected windings of said first and second electrical machines when said relative displacement between said first and second movable input means is desired, each controller means being coupled to a corresponding phase winding in said first plurality and to a corresponding phase winding in said second plurality, wherein any one of said at least two controller means can excite said electrical machines to cause said relative displacement.

20. Apparatus according to claim 19, wherein said first and second movable input means of said mechanical actuator means includes first and second input shafts, respectively, and wherein said first and second rotor are secured for rotation with said first and second input shafts, respectively.

21. Apparatus according to claim 20, wherein said first and second input shafts are rotated at the same speed by said mechanical actuator means when said drive shaft is being rotated, wherein said at least two controller means cooperate to excite said first electrical machine to provide an mmf which slows the rotation of said first input shaft relative to said second input shaft, and wherein said at least two controller means cooperate to excite said second electrical machine to provide an mmf which slows the rotation of said second input shaft relative to said first input shaft.

22. Apparatus according to claim 21, wherein said first and second electrical machines are induction machines having squirrel cage rotors, and wherein said excitation currents are DC excitation currents.

23. Apparatus according to claim 22, wherein said at least one output member includes at least one output shaft that is rotatable about its longitudinal axis, wherein said mechanical actuator means rotates said at least one output shaft in one direction when said first induction machine is excited, and wherein said mechanical actuator means rotates said at least one output shaft in an opposite direction when said second induction machine is excited.

24. Apparatus according to claim 23, wherein said engine is a variable pitch turbofan engine having a fan hub and a spinner, wherein said drive shaft is a turbine shaft, wherein said at least one output shaft includes a plurality of output shafts disposed radially about said spinner, wherein at least one fan blade is attached to each one of said output shafts, wherein said mechanical actuator means couples said plurality of output shafts to said turbine shaft, and wherein said stators of said electrical machines are secured to said hub, whereby said fan blade pitch is adjusted in said one direction when said first electrical machine is excited, and whereby said fan blade pitch is adjusted in said opposite direction when said second electrical machine is excited.

25. Apparatus according to claim 19, wherein each said controller means includes:

microprocessor means, responsive to at least one input parameter, for generating current commands when said relative displacement is desired; and current loop control means, responsive to said current commands, for providing said excitation currents to said corresponding phase windings in said first and second pluralities.

26. Apparatus according to claim 25, wherein each said current loop control means includes a first current loop control coupling said microprocessor means to said corresponding phase winding in said first plurality and a second current loop control coupling said microprocessor means to said corresponding phase winding in said second plurality, said first and second current loop controls functioning to provide said excitation currents to their corresponding phase windings in response to said current commands provided by said microprocessor means.

27. Apparatus according to claim 26, wherein each said current loop control includes:
 duty cycle means, responsive to said current command, for providing duty cycle commands;
 power electronic means, responsive to said duty cycle commands, for generating commutation commands; and
 inverter means, responsive to said commutation commands, for providing said excitation currents.

28. Apparatus according to claim 26, wherein each said microprocessor means provides positive current commands to its first current loop control and negative current commands to its second current loop control, whereby said first electrical machine is excited when said relative displacement in a first direction is desired and whereby said second electrical machine is excited when said relative displacement in a second direction is desired.

29. Apparatus according to claim 28, wherein a single microprocessor comprises said microprocessor means for said at least two controller means, whereby said single microprocessor provides said positive and negative current commands to said current loop controls.

30. Apparatus according to claim 28, wherein said microprocessor means includes at least one microprocessor, whereby said apparatus includes at least two microprocessors, each said microprocessor including current command means for providing said positive current commands to its first current loop control, whereby an excited winding in said first plurality provides mmf which brakes said first rotor, said current command means providing said negative current commands to its second current loop control, whereby an excited winding in said second plurality provides mmf which brakes said second rotor.

31. Apparatus according to claim 30, further including means for controlling spatial distribution of said mmf provided by said first and second electrical machines.

32. Apparatus according to claim 31, wherein each said microprocessor includes status means for issuing status signals indicative of whether the corresponding microprocessor is active, wherein said distribution means includes communication means for allowing said at least two microprocessors to pass said status signals to one another, and wherein each said microprocessor further includes enabling means, responsive to said status signals, for enabling its current command means to provide said positive and negative current commands.

33. Apparatus according to claim 32, wherein said communication means includes a data transmission bus.

34. Apparatus according to claim 32, wherein said status means includes means for performing a BIT, said status signal indicating an active status when said corresponding microprocessor passes said BIT.

35. Apparatus according to claim 32, further including first measuring means for providing position signals indicative of measured position of said output member and second measuring means for providing differential speed signals indicative of differential speed between said first and second electrical machines, wherein said at least one parameter includes a position command, and wherein said current command means includes:
 first error signal means, responsive to said position command and said position signal, for generating a position error signal;
 position regulator means, responsive to said position error signal, for generating a speed command;
 second error signal means, responsive to said speed command and said differential speed signal, for generating a speed error signal, whereby a non-null speed error signal indicates that a relative displacement is desired;
 speed regulator means, responsive to said speed error signal, for generating current commands, said current commands being provided to said enabling means; and
 splitting means, responsive to an output of said enabling means, for providing said current commands having positive values on a first output and for providing said current commands having negative values on a second output, whereby said first output provides said positive current commands and said second output provides said negative current commands.

36. Apparatus according to claim 35, wherein said enabling means includes:
 generator means, responsive to said status signals, for generating current multipliers indicating said current command means to be enabled; and
 multiplier means for multiplying together said current command and said current multiplier, an output of said multiplier means providing an output of said enabling means.

37. Apparatus according to claim 35, wherein each said controller means has means for providing a position signal, wherein each said microprocessor reads and transmits said position signals on said communication means, and wherein each said microprocessor further includes first averaging means for taking a first average of said position signals from said at least two controller means, said first average being supplied to said first error signal means as said position signal.

38. Apparatus according to claim 35, wherein each said controller means has means for providing a differential speed signal, wherein each said microprocessor reads and transmits said differential speed signals on said communication means, wherein each said microprocessor further includes first averaging means for taking a first average of said differential speed signals from said at least two controller means, said first average being supplied said second error signal means as said differential speed signal.

39. Apparatus for controlling blade pitch of a variable-pitch turbofan engine having a turbine shaft and a plurality of output shafts, and mechanical actuator means for mechanically coupling said turbine shaft to said plurality of output shafts, said mechanical actuator means having first and second input shafts, said input shafts being rotated at the same speed by said mechanical actuator means when said turbine shaft is rotating, said mechanical actuator means rotating said output shafts in one direction when said turbine shaft is rotating and when said first input shaft is slowed relative to said second input shaft, said mechanical actuator means rotating said output shafts in an opposite direction when said turbine shaft is rotating and when said second input shaft is slowed relative to said first input shaft, each output shaft being coupled to at least one fan blade, said blade pitch being adjusted by rotating said output shafts about their longitudinal axes, said apparatus comprising:

a first induction machine having a first rotor secured for rotation to said first input shaft and a first stator held stationary with respect to said first rotor, said first stator having a first plurality of isolated windings;

a second induction machine having a second rotor secured for rotation to said second input shaft and a second stator held stationary with respect to said second rotor, said second stator having a second plurality of isolated windings; and at least two controller means cooperating to provide excitation currents to selected windings of said first and second induction machines when said blade pitch is to be adjusted, each controller means being coupled to a corresponding phase winding in said first plurality and to a corresponding phase winding in said second plurality, wherein any one of said at least two controller means can excite said induction machines to adjust said blade pitch.

40. Apparatus according to claim 39, wherein each induction machine has a squirrel cage rotor, wherein each induction machine has its stator secured to a nonrotating structure hub of said turbofan engine, and wherein dc excitation currents are applied to said selected windings.

* * * * *